May 21, 1963     D. F. LINSLEY ETAL     3,090,253
VARIABLE SPEED TRANSMISSION
Filed Dec. 18, 1958     2 Sheets-Sheet 1
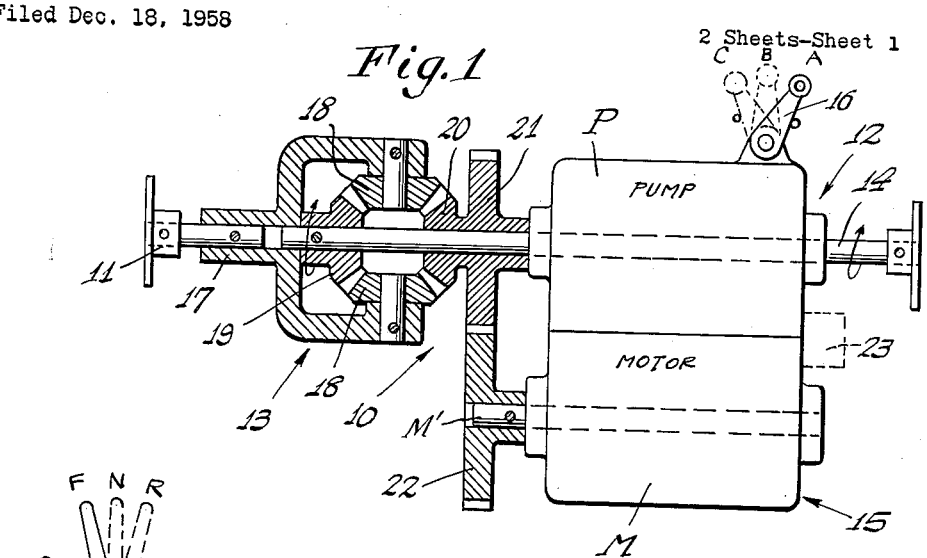
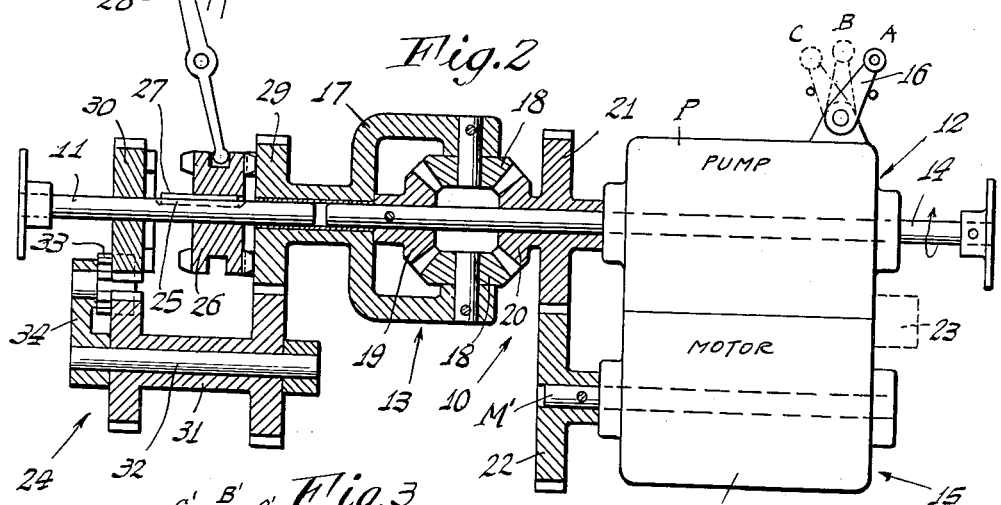
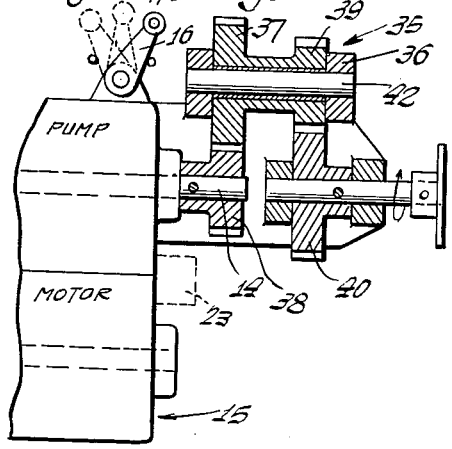
INVENTORS
Douglas F. Linsley
Harry J. Miller, Jr.
BY
Johnson and Kline
ATTORNEYS May 21, 1963 D. F. LINSLEY ETAL 3,090,253
VARIABLE SPEED TRANSMISSION
Filed Dec. 18, 1958 2 Sheets-Sheet 2

INVENTORS
Douglas F. Linsley
Harry J. Miller, Jr
BY
Johnson and Kline
ATTORNEYS

United States Patent Office 3,090,253
Patented May 21, 1963

3,090,253
VARIABLE SPEED TRANSMISSION
Douglas F. Linsley, Westport, Conn., and Harry J. Miller, Jr., Jericho, N.Y., assignors to Morgan Development Laboratories, Inc., Westport, Conn., a corporation of Delaware
Filed Dec. 18, 1958, Ser. No. 781,305
8 Claims. (Cl. 74—687)

This invention relates to a transmission for transmitting power from a drive shaft to a driven shaft. More specifically this invention pertains to a transmission of general utility in which the ratio of speed reduction or increase between the driven shaft and drive shaft is universally variable over the entire range for which the device is constructed without the necessity of breaking the positive chain of driving connections from a prime mover to the mechanism to be driven.

Heretofore, variable speed change units and transmissions having selective gear sets have been known and have been in general use, but these devices present a number of problems which seriously hinder their effectiveness. On the one hand, universally variable speed change units, except in a comparatively small part of their useful range, are extremely inefficient and wasteful of power, while, on the other hand, transmissions having selective gear sets controlling a plurality of fixed speed ratios are efficient but have the drawback that they cannot be shifted or selected without interrupting the transmission of power and are limited in their application by the predetermined fixed ratios selected.

These problems encountered in prior devices have been overcome by the present invention by combining the functions of a variable speed unit and a fixed ratio drive in a unique and advantageous manner whereby the transmission of power in one direction is the function of the conjoint action of a fixed ratio drive and a variable speed drive unit.

According to our invention the transmission of increasing power or motion to the driven member from full stop position to full drive position is effected without varying the speed of the fixed ratio drive unit, but the variation in speed over a wide range imparted to the driven member is solely the function of a reversible variable speed drive unit without the necessity of breaking or otherwise interrupting the positive chain of driving connections. This is an important feature of the present invention.

As an example, let it be assumed that the fixed ratio or constant speed drive is operated at a fixed speed of 2000 r.p.m. in one direction, which we will refer to as a plus value, and the variable speed drive unit is operated at 2000 r.p.m. in the opposite direction, which will hereinafter be referred to as a minus value. The constant speed drive and the variable speed drive unit are so connected to the driven member that even though both drives are operating at maximum speed, the driven member is not rotated. When the speed of the variable speed drive unit is varied from −2000 r.p.m., in the example given, through a first speed range to nil the driven member is moved at an increasing speed in one direction. When nil is reached the driven member will operate at half speed. Thereafter, on varying the speed of the variable speed drive unit through a second speed range from nil to +2000 r.p.m. the speed of the driven shaft is accelerated to full speed in the same direction. Thus, it will be seen, that by means of this unique transmission a driven member may be moved from full stop position to full motion without varying the speed of the constant speed drive, which is driven by a prime mover, by merely varying the speed and direction of rotation of the variable speed drive unit.

A further feature of the invention is that the prime mover can be maintained at optimum speed while the output of the transmission is varied, without a clutch, by the self-contained operation of the variable speed drive unit, which may be either manually or automatically controlled. The variation is accomplished with maximum efficiency, higher than heretofore thought possible.

Another important feature of the present invention is that, in the example given above, the torque being transmitted by the transmission is equally divided between the variable speed drive unit and the constant speed drive, thereby permitting the use of a variable speed transmission of smaller capacity than would be otherwise possible to handle a particular work load.

It should be understood, of course, that the transmission of the present invention, as above referred to, may be so connected to the driven member that, in the case of a vehicle or other traveling mechanism, the forward and reverse motion of the vehicle etc., may be controlled by merely inserting a complementary clutch-type connection between the transmission and the driven member.

According to the invention disclosed herein the constant speed drive, which is operated by a prime mover, functions to drive the variable speed drive unit thereby establishing a fixed operational relationship between the separate driving elements of the transmission. It will be understod that as a result of the established relationship between the driving elements, a variation in speed of the input for the constant speed drive will vary the speed of the variable speed drive unit in direct proportion thereto, so that the transmission will remain in operational balance without requiring any change or adjustment of the mechanism.

Another feature of the invention, therefore, is the adaptability of the transmission to variations in input so that an established operational relationship is maintained between the constant speed drive and variable speed drive unit whereby desired variations in the speed of the variable speed drive unit will function under substantially all conditions to produce the desired results.

For example, functionally it matters not whether the input on the constant speed drive be plus 2000 r.p.m. or plus 1000 r.p.m. since the established relationship between the constant speed drive and variable speed drive unit will maintain a no-drive relationship in the transmission of −2000 r.p.m. or −1000 r.p.m., respectively, of the variable speed drive unit until the unit is adjusted through one or both of its drive ranges.

In the embodiments of the invention shown herein, to attain the objects and advantages above referred to, the constant speed drive and the variable speed drive unit are connected to the driven member through a differential mechanism and the connections are such that at a determinate speed of the variable speed drive unit, −2000 r.p.m. in the example given above, the motion transmitted to the differential by the constant speed drive is equal and opposite to that transmitted by the variable speed drive unit with the result that no motion is transmitted by the differential to the driven member.

In describing the form of the invention disclosed herein, for convenience of explanation emphasis has been placed on speed and speed changing. Since it is the function of this device to deliver the same horsepower on the output shaft as applied by the prime mover on the input shaft, less frictional losses, it will be readily understood that, the horsepower of the prime mover remaining constant, changing of the speed of the output shaft of the transmission will result in a change inversely and proportionally in the torque which the output shaft is able to deliver in performing work.

Other features and advantages of the invention will be apparent from the specification and claims when considered in connection with the attached sheet of drawings, illustrating our invention, wherein like characters represent like parts and in which:

FIGURE 1 is a schematic view showing one form of this invention;

FIG. 2 is a schematic view showing the invention having a clutch and reversing mechanism interposed between the transmission and the driven member;

FIG. 3 is a fragmentary schematic view showing an overdrive interposed between the constant speed drive of the transmission and the prime mover.

Figure 4:
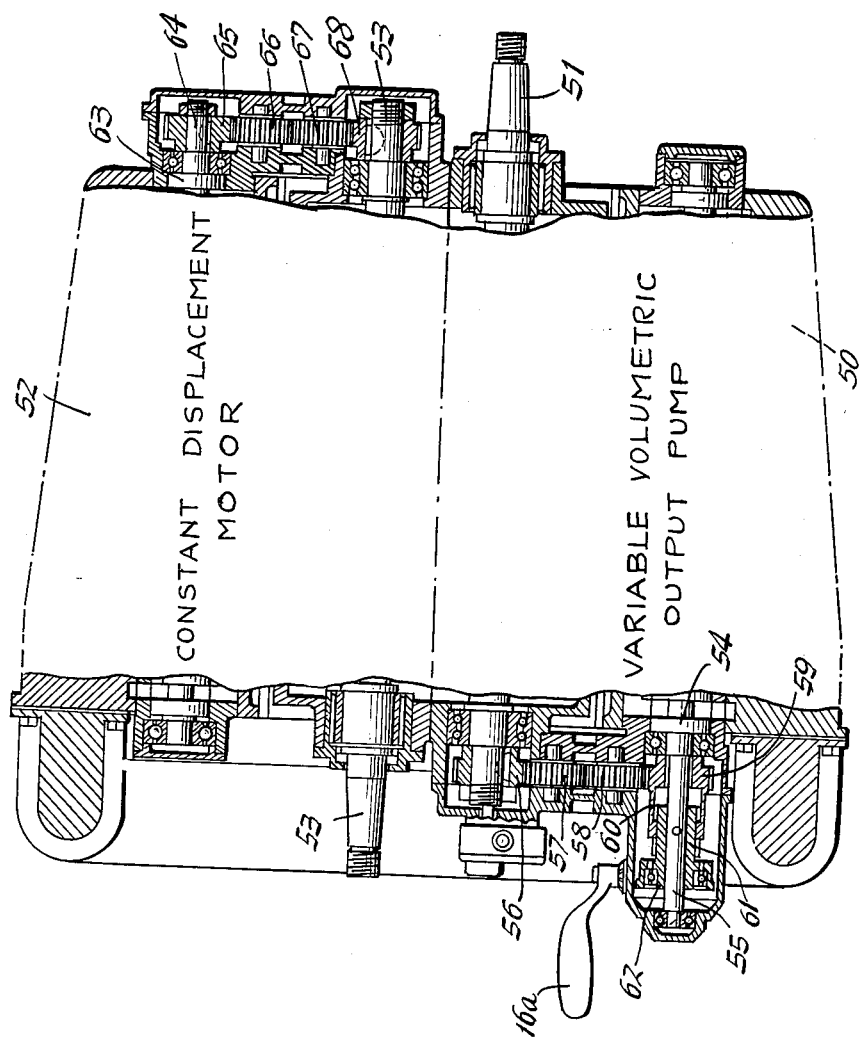
FIG. 4 is a fragmentary view of a variable speed unit, such as shown in our Patent No. 3,038,311, showing in section the valve-operating mechanism for the motor and the pump.

Referring now to the drawings for a more detailed description of the invention, in FIG. 1 a variable speed transmission 10 is shown connected to a driven member or output shaft 11, for driving the same. The transmission, which is adapted to transmit variable power or motion to the driven member, includes a driving means 12, which is adapted to be driven by a conventional prime mover (not shown), and means in the form of a differential mechanism 13 for operably connecting the driving means to driven member 11.

Driving means 12 comprises two separate cooperating drive elements, one of which is a constant speed drive or input shaft 14 adapted to be connected to and driven by the prime mover and the other is a variable speed drive unit 15 which is adapted to be driven by the constant speed drive. While it is contemplated that any conventional reversible variable speed drive unit which will serve the purpose may be used, we prefer utilizing a hydraulic variable speed device of the type disclosed in our Patent No. 3,038,311, granted June 12, 1962. A variable speed device of this type includes a piston and cylinder type fluid pump P, having a volumetric output which is variable without necessarily varying the speed applied to the pump, and a fluid driven motor M, such as the motor disclosed in said patent which has a volumetric output which is constant. According to the present invention the pump of the variable speed drive unit is powered by the input shaft 14, with the resultant flow of fluid in the pump operating the motor M. As was disclosed in our Patent No. 3,038,311, the volumetric output of the pump may be varied to drive the motor at universally variable speeds from nil to a maximum speed in one direction or from nil to a maximum speed in the opposite direction. In order to vary the volumetric output of the pump and thereby vary the speed and direction of output of the variable speed drive unit a control device including a lever 16 is included in the system of the unit. The control lever 16 may be manually or automatically operated and may be infinitely varied between predetermined limits. FIG. 1 shows in full and dotted lines three positions of control lever 16, namely A, B and C, which respectively indicate maximum speed of the motor M in one direction, nil and maximum speed of the motor M in the opposite direction.

At this point it should be understood that constant speed drive 14 is operating at a constant or fixed ratio speed in relation to the operation of the variable speed drive unit, there being an established operational relationship between the two which is only varied by adjustments in the variable speed drive unit which are controlled by control lever 16; variations in input from the prime mover effect the speed of variable speed drive unit 15 in direct proportion to their effect on constant speed drive 14.

The transmission of power or motion from the constant speed drive 14 and the variable speed drive unit 15, which comprises driving means 12, is, as aforenoted, through a differential mechanism 13 which, in the form shown, comprises a yoke 17 secured to the driven member or shaft 11, idler gears 18, a bevel gear 19 on the constant speed drive or input shaft 14 which meshes with the idler gears 18 on one side, and a bevel gear 20 on the other side of the idler gears. The bevel gear 20 is rotatably connected to a gear 21 and both freely rotate on the shaft 14. The gear 21 meshes with a gear 22 secured to the shaft M' of the motor M of the variable speed drive unit 15. Gears 21 and 22 have a one to one ratio as shown. Rotation of the output shaft 11 will be the resultant of the speeds and relative direction of rotation of the bevel gears 19 and 20. Thus, assuming that the input shaft 14 rotates clockwise at a determinate speed carrying bevel gear 19 with it, when bevel gear 20 is rotated by the motor M counterclockwise at a speed of like value to the speed of rotation of bevel gear 19 through gears 21 and 22, as would be the case with control lever 16 in the position A, idler gears 18 will remain stationary and no motion will be transmitted through the yoke 17 to the output shaft 11. Assuming now that control lever 16 is moved to position B so that the speed of variable speed shaft M' is reduced to nil with the result that bevel gear 20 remains stationary, idler gears 18 and yoke 17 will be carried through an orbit around bevel gear 19 at one half the speed of rotation of bevel gear 19. The driven member, which is connected to yoke 17, will therefore likewise be rotated at one half the speed of rotation of the constant speed shaft 14. If we now assume that control lever 16 is shifted to the position C so that the variable speed drive unit is adjusted to drive bevel gear 20 at the same speed and in the same direction as the bevel gear 19, the idler gears 18 will be locked between the bevel gears 19 and 20 and will rotate in an orbit therewith at the same speed at which the bevel gears are rotating. In this manner output shaft 11 is rotated at full speed, i.e. at a speed which is identical with the speed of the input shaft 14.

Through the identical effect at full speed could be achieved by connecting output shaft 11 directly to the input shaft 14 or the prime mover, an advantage achieved by driving the driven member through the transmission illustrated is that the work load is carried by two driving elements, i.e. the constant speed drive and the variable speed drive unit, rather than by one driving element alone.

With respect to the operation of the variable speed drive transmission of FIG. 1, reference is made to the following tables of operation which will illustrate more clearly the relationship between the parts through a full cycle of operation.

| Control Lever Position | Variable Speed Drive Unit, r.p.m. | Constant Speed Drive Unit, r.p.m. | Driven Member, r.p.m. |
|---|---|---|---|
| At —A | −2,000 | +2,000 | 0 |
| From A to B | −2,000 to 0 | +2,000 | 0 to +1,000 |
| At —B | 0 | +2,000 | +1,000 |
| From B to C | 0 to +2,000 | +2,000 | +1,000 to +2,000 |
| At —C | +2,000 | +2,000 | +2,000 |

It will be observed that, with the constant speed drive operating at +2000 r.p.m. (in a clockwise direction) and the control lever in position A, the variable speed drive unit will be operating at −2000 r.p.m. (in a counterclockwise direction) and no motion will be transmitted to driven member 11. It may be said that in the position A of control lever 16 the transmisison is idling, this being true even though the constant speed drive and variable speed drive unit are operating at full speed. On shifting lever 16 through a first range of speed change, from position A to position B, whereby variable speed drive unit 15 is adjusted from −2000 r.p.m. to nil, while constant speed drive 14 remains fixed at +2000 r.p.m., increasing speed in one direction is transmitted to driven member 11 which results in the member achieving one half its potential output as the speed of the variable speed drive unit reaches nil. A further shift of control lever 16, from position B to position C, adjusts variable speed drive unit 15 through a second range of speed range from nil to +2000 r.p.m. in the same direction as the constant speed drive with the result that increasing speed to full potential output in the same direction is transmitted to driven member 11 when variable speed drive unit 15 reaches +2000.

It will be obvious from the above example that by means of the present invention a driven member may have motion transmitted thereto from no motion to full motion in infinite increments by merely adjusting the output of the variable speed drive unit and without breaking or otherwise manipulating the chain of driving connections.

Recognizing the possibility of a load in excess of the capacity of the device being placed on driven member 11, it is contemplated that a safety means 23 (shown in dotted lines) of any type commonly known to the art, be incorporated in variable speed drive unit 15 to prevent destruction of the unit by abnormal high torque or strain. The variable speed drive unit as disclosed in our Patent No. 3,038,311 is provided with integral safety means in the form of bypasses, etc., for taking up the excess torque which can normally be expected in the operation of the device.

In FIG. 2 a modified form of the invention is shown which includes disconnecting and reversing means 24 interposed between transmission 10 and output shaft 11 for reversing the direction of the motion imparted to the driven member by driving means 12. In this embodiment of the invention the shaft of driven member 11 is provided with a keyway 25 adapted to slidably shiftably carry a slide clutch 26 having a key 27 engaging the keyway. Means in the form of a pivotally mounted lever 28, engaging clutch 26, are adapted to shift the clutch along the shaft from forward position through neutral position to reverse position. When the clutch is in forward drive position F (shown in solid lines) it engages the face of a gear 29 rotatably connected with yoke 17 of differential mechanism 13. On the yoke being turned, as previously described, motion is imparted to driven member 11 through gear 29 on the yoke, clutch 26 and key 27.

If it is desired to reverse the direction of the motion imparted to driven member 11 without reversing the drive of the transmission, lever 28 is shifted to reverse position R to move clutch 26 out of engagement with gear 29 and into engagement with a gear 30 rotatably carried by driven member 11. A reverse gearing assembly 31 carried by a countershaft 32 and an idler gear 33 carried by a bracket 34 operably connect reverse gear 30 to gear 29 driven by the yoke 17 of differential mechanism 13. When clutch 26 has been shifted to reverse position, the clockwise rotation of driving gear 29 will rotate reverse gearing assembly 31 on countershaft 32 in a counterclockwise direction thereby rotating idler gear 33 in a clockwise direction and reversing gear 30 and driven member 11 in a counterclockwise direction. It will be understood that other forms of external reversing mechanism may be interposed between the driven member and the transmission if desired.

Should it be desired to completely operably disconnect the driven member from the transmission, as is common in automotive uses so that a vehicle may be moved without operating the entire driving train, lever 28 is shifted to neutral position N so that clutch 26 is disengaged from driving gear 29 and reversing gear 30 and spaced therebetween.

In FIG. 3 a further modification of the invention is shown wherein an overdrive or similar step-up device 35 is interposed between the prime mover and constant speed drive 14 to increase the input in the constant speed drive without increasing the output of the prime mover. By means of the overdrive, increased motion or speed are imparted to the constant speed drive, variable speed drive unit and driven member without increasing the speed of the prime mover.

According to this embodiment of the invention, a gear train 36, having an enlarged gear 37 at one end meshing with a gear 38 on constant speed drive 14 and a gear 39, of reduced diameter, at the opposite end meshing with an enlarged gear 40 on the drive shaft 41 of the prime mover, is rotatably mounted on a counter shaft 42. As illustrated, it will be obvious that on rotation of gear 40 by the prime mover, gear train 36 will be rotated in the opposite direction at increased speed with the result that gear 38 and constant speed drive 14 will be rotated in the same direction as the shaft of the prime mover at further increase in speed. Variations in related gear ratios may be made to increase or decrease the relative input between the prime mover and the constant speed drive.

An advantage of the transmission of our invention is that in the stop or no-drive condition of the output shaft represented by the control lever 16 being in position A in the example above given, the prime mover connected to the constant speed drive element of the differential and the variable speed drive may each be operated at optimum speeds to provide the maximum torque best suited to start and accelerate the motion of a vehicle or other mechanism to be operated. This is an important feature, especially when the prime mover is of a type which has low efficiency at slow speeds and in conventional applications requires a slip clutch or some other torque release to permit it to attain an operating speed before the application of a load.

With the transmission herein disclosed, when the control lever for the variable speed unit is in no-drive position A, an internal combustion engine for instance, rigidly connected to the transmission may be started and accelerated to the desired speed before the variable speed control lever is operated to cause the transmission to perform the work for which it is intended. A further advantage of the transmission of the present invention is that if the prime mover is decelerated and stopped while the transmission is out of no-drive condition, there is no necessity for going through successive steps to restore the variable speed control to that condition; it is merely a matter of returning the control lever from wherever it is located to its position A in the example above given.

In starting the output shaft with an applied load for which the transmission is designed, movement of the control lever 16 from no-drive position A causes torque theoretically approaching an infinite value (but limited by the design capacity of the transmission and the capacity of the prime mover) to be immediately applied to the output shaft and the load. As movement of the control lever continues from position A the torque applied to the output shaft decreases proportionately as the speed of the output shaft increases; thus it will be seen that the horsepower delivered to the output shaft is always equal to that delivered by the prime mover less frictional losses. As a further example, assuming that at 1:1 speed ratio the prime mover speed is 2000 r.p.m. and the output shaft speed is 2000 r.p.m., when the variable speed unit is adjusted for one quarter speed condition, i.e. 500 r.p.m. on the output shaft, and assuming 100% efficiency and no reduction in horsepower, the torque applied to the output shaft becomes four times the prime mover torque—in other words, four times what it was at 1:1 speed ratio in which the torque of the output shaft equals the torque of the prime mover.

Another advantage of the transmission herein disclosed is that, by operating the variable speed unit over its full range of speed changes, in both clockwise and counterclockwise direction, for instance from 2000 r.p.m. in one direction to 2000 r.p.m. in the other direction, an effective range of speed change of 4000 r.p.m. is obtained, yet wear and tear on the motor pump unit is substantially reduced by operating the variable speed unit at 2000 r.p.m. rather than at 4000 r.p.m. An inherent characteristic of the transmission herein disclosed is that operating the variable speed unit at full speed range in both reverse and forward directions permits controlling the output shaft from zero speed to maximum speed without altering the speed of the prime mover. Also there can be an optimum speed at which the prime mover may be operated and at which the speed of the variable speed unit can be set at or near zero.

As shown in FIG. 4, the variable speed unit disclosed in our Patent No. 3,038,311 comprises a pump 50 having an input shaft 51 connected to a prime mover and operating the pistons of the pump. The motor 52 has an output shaft 53 connectible to mechanism to be driven. The motor has constant volumetric displacement. The pump 50 has a volumetrically variable output.

The length of the strokes of the pistons of the pump remain constant, but the amount of fluid discharge into the pressure manifold is variable and is controlled by a cylindrical valve 54 having a shaft 55 driven by the input shaft 51 through gears 56, 57, 58 and 59.

In order to vary the output of the pump and the direction of flow of fluid output thereof, means are provided for universally changing the phase or timing of the valve 54 with relation to the shaft 51 which operates the pistons. As shown in said patent, this is accomplished by altering the train of connections between the cam shaft and the valve, and for this purpose the gear 59 is mounted for rotary movement on the valve shaft 55, but is coupled thereto by a variable connection by which the shaft 55 may be angularly advanced in the direction of rotation of the valve shaft 55 or retracted relative thereto. For this purpose, the gear 59 is provided with a sleeve 60 having a telescopic connection with a sleeve 61 on a collar 62 slidably mounted on the shaft 55.

As shown in said patent, the sleeve 61 has helical grooves into which extend pins carried by the shaft 55 and is splined thereto so as to rotate therewith and transfer the motion from the gear 59 to the valve shaft 55.

The sleeve 61 is moved axially by mechanism described and illustrated in our said Patent No. 3,038,311, under the control of a lever 16a which, like the lever 16 shown in FIGS. 1 and 2, is movable from one extreme position where maximum volumetric output of the pump is conducted to one manifold leading to the motor to an intermediate position in which the volumetric output of the pump is reduced to nil and an extreme position opposite to the first position in which the maximum volumetric output of the pump is conducted to the other manifold leading to the motor.

The motor 52 has a valve mechanism 63 having a shaft 64 to which is secured a gear 65 meshing with idler gears 66 and 67, the latter meshing with a gear 68 carried by the output shaft 53 of the motor. The phase relationship between the valve 63 and the output shaft is such that the volumetric intake of the motor is maximum, and since there are no variable connections between the output shaft 53 and the cam shaft 64, the volumetric intake is constant. Thus the speed of the motor will be at maximum when the control lever on the pump is in one extreme position and will gradually decrease as the lever is moved to neutral or nil position where rotation of the motor ceases and will gradually increase in the opposite direction to maximum speed as the control lever 16a is moved to its other extreme position.

Thus, among others, the several features and advantages of the invention as aforenoted are achieved. Obviously numerous changes in construction and method may be resorted to without departing from the concepts which are basic to the invention as defined by the claims.

We claim:

1. A variable speed transmission comprising a driven member; a driving means including a constant speed drive and a variable speed drive having a hydraulic pump having a variable volumetric output and a hydraulic motor having a constant volumetric displacement, the pump being driven by said constant speed drive and said variable speed drive having a range of speed change from a determinate value in one direction to nil and a second range of speed change from nil to said determinate value in the opposite direction, said determinate value being substantially the same as the value of the constant speed drive; means for adjusting the variable speed drive solely by varying the volumetric output of the pump for varying the output speed and direction of the variable speed drive between said first and second determinate values; and means for connecting both the constant speed drive and variable speed drive to said driven member, said driving means transmitting no motion to said driven member when said variable speed drive is operating at said first determinate value and transmitting increasing motion to drive the driven member solely in said one direction as said variable speed drive is varied through said first range to nil and thereafter through said second range in the opposite direction to said determinate value.

2. A variable speed transmission comprising a driven member; a driving means including a constant speed drive and a variable speed drive having a hydraulic pump having a variable volumetric output and a hydraulic motor having a constant volumetric displacement, the pump being driven by said constant speed drive and said variable speed drive having a range of speed change from a determinate value in one direction to nil and a second range of speed change from nil to said determinate value in the opposite direction, said determinate value being substantially the same as the value of the constant speed drive; means for adjusting the variable speed drive solely by varying the volumetric output of the pump for varying the output speed and direction of the variable speed drive between said first and second determinate values; and means for connecting both the constant speed drive and variable speed drive to said driven member, said connecting means including a differential mechanism having said constant speed drive connected to one side thereof and said variable speed drive operably connected to an opposed side thereof, said driving means transmitting no motion to said driven member when said variable speed drive is operating at said first determinate value and transmitting increasing motion to drive the driven member solely in said one direction as said variable speed drive is varied through said first range to nil and thereafter through said second range in the opposite direction to said determinate value.

3. A variable speed transmission comprising a driven member; a driving means including a constant speed drive and a variable speed drive having a hydraulic pump having a variable volumetric output and a hydraulic motor having a constant volumetric displacement, the pump being driven by said constant speed drive and said variable speed drive having a range of speed change from a determinate value in one direction to nil and a second range of speed change from nil to said determinate value in the opposite direction, said determinate value being substantially the same as the value of the constant speed drive; means for adjusting the variable speed drive solely by varying the volumetric output of the pump for varying the output speed and direction of the variable speed drive between said first and second determinate values; and a differential mechanism for operably connecting both the constant speed drive and variable speed drive to said driven member, said differential mechanism having said constant speed drive connected at one side thereof and said variable speed drive operably connected to an opposed side thereof and including a yoke member connected to said driven member for imparting motion thereto, said driving means transmitting no motion to said driven member through said differential mechanism when said variable speed drive is operating at said first determinate value and transmitting increasing motion to drive the driven member solely in said one direction as said variable speed drive is varied through said first range to nil and thereafter through said second range in the opposite direction to said determinate value.

4. A variable speed transmission comprising a driven member; a driving means including a constant speed drive and a variable speed drive having a hydraulic pump having a variable volumetric output and a hydraulic motor having a constant volumetric displacement, the pump being driven by said constant speed drive and said variable speed drive having a range of speed change from a first determinate value in one direction to nil and a second range of speed change from nil to a determinate value in the opposite direction, said determinate value being substantially the same as the value of the constant speed drive; means for adjusting the variable speed drive solely by varying the volumetric output of the pump for varying the output speed and direction of the variable speed drive between said first and second determinate values; and means for connecting both the constant speed drive and variable speed drive to said driven member, said driving means transmitting no motion to said driven member when said variable speed drive is operating at said first determined value and transmitting motion increasing to substantially one-half of full value in one direction as said variable speed drive is varied through said first range to nil and thereafter increasing to full motion in the same direction as said variable speed drive is varied through said second range in the opposite direction to said determinate value.

5. In combination a prime mover and a variable speed transmission; said transmission including a constant speed drive operably connected to and driven by said prime mover, a variable speed drive having a hydraulic pump having a variable volumetric output and a hydraulic motor having a constant volumetric displacement, the pump being driven by said constant speed drive, said variable speed drive having a range of speed change from a first determinate value in one direction to nil and a second range of speed change from nil to a determinate value in the opposite direction, said determinate value being substantially the same as the value of the constant speed drive, means for independently adjusting the variable speed drive solely by varying the volumetric output of the pump between said first and second determinate values without varying the speed of said constant speed drive for varying the output speed and direction of the variable speed drive, and a differential mechanism for connecting both the constant speed drive and variable speed drive to said driven member, said differential mechanism transmitting no motion to said driven member when said variable speed drive is operating at said first determinate value and transmitting increasing motion to drive the driven member solely in said one direction as said variable speed drive is varied through said first range to nil and thereafter through said second range in the opposite direction to said determinate value.

6. A combination as in claim 5, and means operably between said prime mover and said constant speed drive and connecting the same for altering the driving ratio therebetween.

7. In combination a prime mover and a variable speed transmission; said transmission including a constant speed drive operably connected to and driven by said prime mover, a variable speed drive having a hydraulic pump having a variable volumetric output and a hydraulic motor having a constant volumetric displacement, the pump being driven by said constant speed drive, said variable speed drive having a range of speed change from a first determinate value in one direction to nil and a second range of speed change from nil to a determinate value in the opposite direction, said determinate value being substantially the same as the value of the constant speed drive, means for independently adjusting the variable speed drive solely by varying the volumetric output of the pump between said first and second determinate values without varying the speed of said constant speed drive for varying the output speed and direction of the variable speed drive, and a differential mechanism having said constant speed drive connected at one side thereof and said variable speed drive connected at an opposite side thereof, said differential mechanism including a yoke member operably connected between said opposed sides and connected to said driven member for transmitting motion thereto, said differential mechanism transmitting no motion to said driven member when said variable speed drive is operating at first said determinate value and transmitting increasing motion to drive the yoke solely in one direction as said variable speed drive is varied through said first range to nil and thereafter through said second range in the opposite direction to said determinate value.

8. A variable speed transmission comprising a driven member; a driving means including a constant speed drive and a variable speed drive having a hydraulic pump having a variable volumetric output and a hydraulic motor having a constant volumetric displacement, the pump being driven by said constant speed drive and said variable speed drive having a range of speed change from a first determinate value in one direction to nil and a second range of speed change from nil to a second determinate value in the opposite direction, said determinate value being substantially the same as the value of the constant speed drive; means for adjusting the variable speed drive solely by varying the volumetric output of the pump for varying the output speed and direction of the variable speed drive between said first and second determinate values; and means for connecting both the constant speed drive and variable speed drive to said driven member, said connecting means including a differential mechanism having said constant speed drive connected to one side thereof and said variable speed drive operably connected to an opposed side thereof, said first side of said mechanism having constant motion imparted thereto at a determinate speed by said constant speed drive, said opposed side having motion imparted thereto in the opposite direction at substantially the same speed as said first side of said mechanism when said variable speed drive is operating at said first determinate value and having motion imparted thereto in the same direction and at substantially the same speed as said first side when said variable speed drive is operating at said second determinate value, said driving means transmitting no motion to said driven member when said variable speed drive is operating at said first determinate value and said sides of said differential mechanism are moving at equal speeds in opposite directions, said driving means transmitting increasing motion in one direction to said driven member as said variable speed drive is varied through said first range to nil and thereafter through said second range in the opposite direction to said determinate value.

References Cited in the file of this patent
UNITED STATES PATENTS

| 2,154,710 | Thoma | Apr. 18, 1939 |
| 2,599,814 | Cull | June 10, 1952 |
| 2,774,255 | Morris | Dec. 18, 1956 |
| 2,897,691 | Lowe | Aug. 4, 1959 |
| 2,901,922 | Baker | Sept. 1, 1959 |
| 2,924,123 | Giles | Feb. 9, 1960 |